US012716442B2

(12) United States Patent
Hryniewicz

(10) Patent No.: US 12,716,442 B2
(45) Date of Patent: Aug. 25, 2026

(54) FRAMING SYSTEM INCLUDING TUBES JOINED WITH SLOTS, HOOKS AND WEDGES INTEGRATED INTO THE TUBES

(71) Applicant: Greg Hyde Hryniewicz, Annapolis, MD (US)

(72) Inventor: Greg Hyde Hryniewicz, Annapolis, MD (US)

( * ) Notice: Subject to any disclaimer, the term of this patent is extended or adjusted under 35 U.S.C. 154(b) by 246 days.

(21) Appl. No.: 18/409,443

(22) Filed: Jan. 10, 2024

(65) Prior Publication Data

US 2024/0229479 A1 Jul. 11, 2024

Related U.S. Application Data

(60) Provisional application No. 63/438,179, filed on Jan. 10, 2023.

(51) Int. Cl.

*F16B 7/04* (2006.01)
*F16B 7/22* (2006.01)
*F16B 12/50* (2006.01)

(52) U.S. Cl.

CPC .............. *F16B 7/0486* (2013.01); *F16B 7/22* (2013.01); *F16B 12/50* (2013.01); *F16B 2200/30* (2018.08); *Y10T 403/4602* (2015.01)

(58) Field of Classification Search

CPC ........... E04G 7/303; E04G 7/305; E04G 7/32; E04G 7/34; F16B 7/0486; F16B 7/18; F16B 7/22; F16B 9/09; F16B 12/50; F16B 12/52; F16B 2200/30; Y10T 403/30; Y10T 403/4602; Y10T 403/7016

USPC .................................................. 403/375, 381

See application file for complete search history.

(56) References Cited

U.S. PATENT DOCUMENTS 3,332,374 A * 7/1967 Ferdinand ............... F16B 12/30 108/147.11
3,858,988 A * 1/1975 Cohen ....................... F16B 7/22 403/18
3,989,399 A * 11/1976 Slowbe ................... E04B 9/127 403/353
4,250,679 A * 2/1981 Burg ....................... F16B 12/28 52/654.1
4,479,737 A * 10/1984 Bergh ................... F16B 5/0607 52/658

(Continued)

FOREIGN PATENT DOCUMENTS

DE 102013107034 B3 * 8/2014 .............. F16B 12/50
FR 2432638 A1 * 2/1980 .............. F16B 12/50

(Continued)

*Primary Examiner* — Amber R Anderson
*Assistant Examiner* — Kevin J Baynes
(74) *Attorney, Agent, or Firm* — Nixon & Vanderhye P.C.

(57) ABSTRACT

A framing system and method of mechanically joining tubular elements to form frames without the need for welding technologies or connectors. The frames are two dimensional or, e.g., horizontal or vertical planes, or three-dimensional frames, e.g., cubes or rectangles. These joints between tubes are formed by fastening features cut into the tubes. The fastening features include hooks, slots, wedges and other shapes. The fastening features engage with each other to form joints between tubes that form a frame. The tubes can be metal or plastic or other material, and have cross sectional shapes of square, rectangular, rounded or other.

25 Claims, 18 Drawing Sheets

(56) References Cited

U.S. PATENT DOCUMENTS 4,656,801 A * 4/1987 Erlam .................. A47B 47/021 52/475.1
5,806,820 A * 9/1998 Simon .................... H02G 3/263 248/222.52
6,223,916 B1 * 5/2001 Enos .................... A47B 57/408 248/242
6,379,074 B1 * 4/2002 Chin ..................... F16B 7/0486 403/231
6,471,434 B2 * 10/2002 Chin ....................... F16B 12/44 403/231
6,546,684 B2 * 4/2003 Waalkes ................ E04B 2/7433 52/239
6,643,988 B1 * 11/2003 Armstrong ................ E06B 3/96 403/231
7,223,043 B1 * 5/2007 Andrews ................. E04B 2/766 403/230
8,104,238 B2 * 1/2012 Wilson ................ E06B 3/66314 52/786.13
8,931,233 B2 * 1/2015 Cooper ..................... E04B 1/24 52/843
9,353,546 B2 * 5/2016 Garza Montemayor .................... E04H 17/143
9,730,512 B1 * 8/2017 Bruder .................... F16B 12/52
10,299,594 B2 * 5/2019 Liss ..................... A47B 47/027
10,389,092 B2 * 8/2019 Matsumoto .......... A47B 47/027
10,982,699 B2 * 4/2021 Bright ....................... F16B 2/22
11,293,174 B2 * 4/2022 Raikh ..................... E04B 1/388
12,004,646 B2 * 6/2024 Straatsma ............ A47B 47/027
2014/0105674 A1 * 4/2014 Hayashi ................ E04B 1/5818 403/230
2018/0231040 A1 * 8/2018 Sauter ....................... A47F 5/01

FOREIGN PATENT DOCUMENTS

FR 2839209 A1 * 10/2003 ............... H02B 1/30
KR 200464693 Y1 * 1/2013 ............. A47B 13/06
WO WO-03035996 A1 * 5/2003 .......... E04F 11/1817

* cited by examiner 30
28
30
26
26a
26a
26
y
25
27
6
26
42
30
28
26
30
28
29
36

FRAMING SYSTEM INCLUDING TUBES JOINED WITH SLOTS, HOOKS AND WEDGES INTEGRATED INTO THE TUBES

RELATED APPLICATION

This application incorporates by reference and claims priority to U.S. provisional patent application 63/438,179, filed Jan. 10, 2023.

TECHNICAL FIELD

This invention relates to a system of mechanically joining tubes to form framed 2D and 3D structures, such as outdoor cooking grills, furniture, and prefabricated buildings.

BACKGROUND

In the past, tubes have been used to create frames and other structures. These tubes have ends that are typically cut straight across such that all portions of an end are in a two-dimensional (2D) plane. The ends of the tubes are joined by welding or by various types of unions, brackets and connectors. These traditional methods of joining tubes have drawbacks. In the case of welding, significant expertise and equipment are needed to weld, especially if the structure requires high aesthetic appeal and dimensional accuracy. It is known that welding can deform the element that it is trying to join, further complicating dimensional accuracy. Alternately, the use of connectors, brackets or unions can greatly increase the expense of the frame system by the increased number of elements and the time to connect them all. These connectors, brackets and unions are commonly not aesthetically appealing and can create obstructions if other elements are attached to the original frame.

SUMMARY

The invention may be embodied as a framing system having interconnected tubular members that are quickly and efficiently jointed to for a frame that is strong, secure, and dimensionally accurate.

This invention may also be embodied as method to join tubular members whereby at least end regions of the tubular members are precisely pre-cut to have interlocking shapes that allow the tubular members to be put together like pieces of a puzzle. The end regions may have small openings to receive a fastener to secure the joint with a brace arm. The fastener could be a screw, a pin, or a rivet.

The inventive method may include mechanically joining tubular elements together without the need for welding or connectors to create tubular framed structures. The frame structure may be two dimensional frames, e.g., a horizontally oriented frame or a vertically oriented frame. The frame structure may be a three-dimensional frame, such as a cube or rectangular.

The tubular members tubes have fastening features that may comprise of a variety of carefully cut sections in the tube to form hooks, slots, wedges, and other shapes that enable flexible, efficient, and strong assembly of a variety of tubes. The tubes may be made from metal or plastic or other material. The cross-sectional shape of each tube may be square or rectangular with rounded corners, round, oval or other shapes. The tubes in each framing system may be but need not be of equal dimensions or shape.

The invention may provide benefits to prior framing systems. The benefits include, but are not limited to, the following:

Fewer parts result in a lower direct cost because less components need to be specified, sourced, acquired, and handled.

Lower assembly time because the measuring and cutting of tubes is completed by a machine. Manual labor is limited to assembly only and not fabrication. Furthermore, the layout may be predetermined which also greatly enhances assembly time.

The fastening features are formed accurately by being precisely cut and notched by a computer numerical control (CNC) machine. The dimensional accuracy of the structures cut with CNC is high. Combined with no welding, the framed structure is exceptionally accurate, true and square.

The framing system may be formed with small tubes, e.g., cross-sectional dimension of 0.25 inch to 2 inches, to form, for example, outdoor kitchen frames, and large tubes, e.g., 6 inches to two feet, to form large structures such as prefabricated steel buildings. Thus, the framing system can be applied to tubes having a cross sectional dimension in a range 0.25 inch to two feet, 0.5 inch to 2 inches, 6 inches to 2 feet, or other cross-sectional dimensions.

The invention may be embodied with a flexible and configurable framing system. The system may have multiple slots cut into the frames. The slots may allow the tubes to be joined to form different pre-planned configurations of simple cubes and rectangles. The tubes may also be arranged in simple cubes or into complex framed structures.

The invention may be embodied with clean design features of frames. The frames may have no obstructions to the outside face of the frame, making the fastening of panels, or other elements to the frames easier and more accurate. In contrast, welds form protruding prouds that need to be ground down or brackets which protrude from the face of the frame creating a proud obstruction from the face of the frame.

The invention may be embodied as a framing system comprising: a first type of hollow tubes, e.g., X axis tube, with an end from which extends opposing hooks and a male member between the opposing hooks, and a second type of hollow tubes, e.g., Y axis tube, having slots arranged to receive the opposing hooks of the first hollow tube and a female member configured to receive the male member. The framing system may further comprise a third type of hollow tubes, e.g., Z axis tube, including a first end with tabs, wherein the second hollow tube includes slots configured to receive the tabs. Each of the slots may form a gap in the second hollow tube having a width corresponding substantially to the thickness of the hook configured to fit into the slot.

The first, second and/or third types of hollow tubes may be substantially rectangular or square in cross section with rounded corners. The first, second and/or third hollow tubes may be each at least one of a metal hollow tube and a plastic hollow tube.

The male member may have a first trapezoidal shape which expands in a direction away from the first hollow tube and towards the second hollow tube, and the female member forms an opening in the second hollow tube having a second trapezoidal shape configured to receive the first trapezoidal shape.

A first aperture may be in a first hook of the hooks and a second aperture in the slot configured to receive the first hook, wherein the first aperture and the second aperture align when the first hook is in the slot, and wherein the first aperture and the second aperture, when aligned, form an opening configured to receive a locking fastener. The locking fastener may be a pin, screw or rivet. The first aperture and the second aperture may each have a dimension in a direction of an axis of the corresponding first hollow tube or second hollow tube, wherein the dimension is substantially equal to a diameter of the fastener plus a thickness of one of the hooks.

A first slot of the slots may be in an end of the second hollow tube, the first slot including an open side aligned with the end of the second hollow tube, and a closed side formed by a cutout in into the end of the second hollow tube.

The second hollow tube may include a first set of the slots and the female member adjacent a first end of the second hollow tube wherein the slots partially extend through a first side of the second hollow tube, and a second set of the slots and the female member adjacent the first end of the second hollow tube wherein the slots partially extend through a second side of the second hollow tube and the second side is opposite to the first side.

The invention may be embodied as framing system comprising: a first type of hollow tubes having first opposing sidewalls and a first upper wall spanning the first opposing sidewalls, wherein an end of the first hollow tube includes a pair of opposing hooks each extending from a respective one of the opposing sidewalls and a first portion of an interlocking joint extending from the upper wall; a second hollow tube including second opposing sidewalls and a second upper wall spanning the second opposing sidewalls, the second hollow tube includes opposing slots each extend partially through the second upper wall and partially down through a first sidewall of the second opposing sidewalls, wherein the opposing slots are separated by a gap corresponding to a gap between the hooks in the pair of opposing hooks and the opposing slots are configured to receive the opposing hooks, wherein a second portion of the interlocking joint is in the second upper wall and extends to the first sidewall, and wherein the first portion and the second portion are configured to interlock to secure the first hollow tube to the second hollow tube while the opposing hooks engage the opposing slots.

The first portion may be a male portion of a dovetail joint from the end of the first hollow tube, and the second portion may be a female portion of the dovetail joint forming an opening in the second hollow tube.

The framing system may include a third hollow tube having an upper end with opposing tabs and each of the tabs is on a respective one of opposing sidewalls of the third hollow tube, wherein the opposing tabs on the upper end of the third hollow tube fit into bottom slots in a bottom wall of the first hollow tube.

Each of the slots may form a gap in the second hollow tube having a width corresponding substantially a thickness of the hook configured to fit into the slot.

The first hollow tube and the second hollow tube may be substantially rectangular in cross section with rounded corners.

The first hollow tube and the second hollow tube may each be at least one of a metal hollow tube and a plastic hollow tube.

A first aperture may be in a first hook of the hooks and a second aperture in the slot configured to receive the first hook, wherein the first aperture and the second aperture align when the first hook is in the slot, and wherein the first aperture and the second aperture, when aligned, form an opening configured to receive a locking fastener. The locking fastener may be a pin, screw or rivet. The first aperture and the second aperture may each have a dimension in a direction of an axis of the corresponding first hollow tube or second hollow tube, wherein the dimension is substantially equal to a diameter of the fastener plus a thickness of one of the hooks.

A first slot of the opposing slots may be in an end of the second hollow tube, the first slot including: an open side aligned with the end of the second hollow tube, and a closed side formed by a cutout in into the end of the second hollow tube.

The second hollow tube may include: a first set of the slots and the second portion of the interlocking joint adjacent a first end of the second hollow tube wherein the slots partially extend through a first sidewall of the second opposing sidewalls of the second hollow tube, and a second set of the slots and the second portion of the interlocking portion adjacent the first end of the second hollow tube wherein the slots partially extend through a second sidewall of the second opposing sidewalls, and the second sidewall is opposite to the first sidewall.

The invention may be embodied as method to manufacture a framing system comprising:

laser cutting an end of a first hollow tube to remove material from the end to form hooks extending from opposite sidewalls of the first hollow tube and a male member extending from an upper wall of the first hollow tube, laser cutting opposing slots into a second hollow tube, wherein the laser cuts each of the slots to extend partially through an upper wall of the second hollow tube and partially down through a sidewall of the second hollow tube, and laser cutting a female member into the upper wall of the second hollow tube, wherein the female member is between the opposing slots and is configured to receive the male member to secure the first hollow tube to the second hollow tube while the hooks engage the opposing.

The male member may be a first portion of a dovetail joint and the female member is a second portion of the dovetail joint.

The method may include laser cutting an end of a third hollow tube to form opposing tabs where each of the tab is cut from one of opposing sidewalls of the third hollow tube, and laser cutting bottom slots in a bottom wall of the second hollow tube, wherein the bottom slots are configured to receive the opposing tabs of the third hollow tube.

Each of the slots may form a gap in the second hollow tube having a width corresponding substantially to a thickness of the hook configured to fit into the slot.

The first hollow tube and the second hollow tube may be substantially rectangular in cross section with rounded corners. The first hollow tube and the second hollow tube may each be at least one of a metal hollow tube and a plastic hollow tube.

The method may include laser cutting a first aperture in a first hook of the hooks and laser cutting a second aperture in the slot configured to receive the first hook, wherein the first aperture and the second aperture align when the first hook is in the slot, and wherein the first aperture and the second aperture, when aligned, form an opening configured to receive a locking fastener.

The first aperture and the second aperture may each have a dimension in a direction of an axis of the corresponding first hollow tube or second hollow tube, wherein the dimension is substantially equal to a diameter of the fastener plus a thickness of one of the hooks.

A first slot of the opposing slots may be in an end of the second hollow tube, the first slot including: an open side aligned with the end of the second hollow tube, and a closed side formed by a cutout in into the end of the second hollow tube.

The method may include laser cutting of the second hollow tube by: laser cutting a first set of the opposing slots and the female member adjacent a first end of the second hollow tube wherein the opposing slots partially extend through a first sidewall of the second hollow tube, and laser cutting a second set of the opposing slots and the female member adjacent the first end of the second hollow tube, wherein the slots partially extend through a second sidewall of the second hollow tube, and the second sidewall is opposite to the first sidewall.

DETAILED DESCRIPTION

Figure 1:
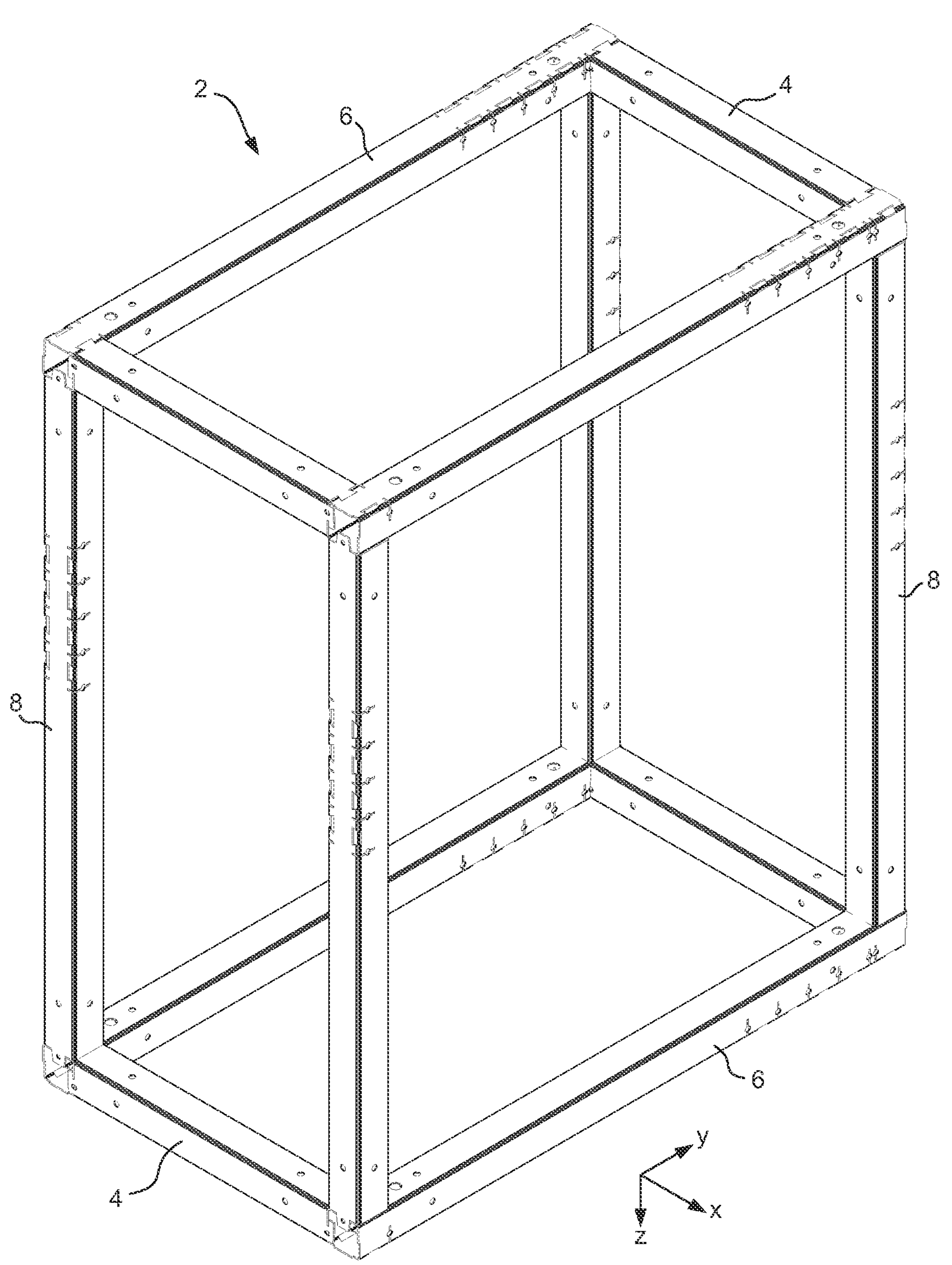
FIG. 1 is a perspective view of a basic exemplary cubed frame unit using formed by assembly X-axis tubes, Y-axis tubes and Z-axis tubes.

FIG. 1 shows a basic exemplary cubed frame unit 2 formed by a framing system including X-axis tubes 4, Y-axis tubes 6 and Z-axis tubes 8. The tubes are joined at their ends. The ends of each tube have slots, hooks, cut-outs, tabs and/or apertures, collectively referred to as fastening features, which connected each tube to an adjacent tube.

The fastening features are integrated into the tubes, such as at the end regions of the tubes. The tube and its fastening features are a single piece component. A tube is joined with another tube by interlocking and connecting the fastening features on the tube with the fastening features of the another tube. The fastening features may be sufficient by themselves to join the tubes.

The fastening features may also ease the assembly of the tubes by allowing the tubes to be assembled by moving the fastening features at the end of one tube into the matching fastening features of another tube. It also eases assembly that fasteners separate from the tubes are not needed to join the tubes.

The fastening features may be formed by laser cutting using a computer numerically controlled (CNC) machine to guide a laser to for the fasteners on the tubes. The CNC machine may be programed to laser cut fastening features according to predefine set parameters and dimensions selected by the operator of the machine. The parameters may include the cross-sectional dimensions of the tube, such as height and width; the thickness of the material forming the tube; the type of material forming the tube, such as metal or plastic; dimensions and shape of the fastening features to be cut into the tube, and location along the tube of each of the fastening features.

By integrating the fastening features into the tube, the need is reduced for additional fasteners, the risk is minimized of missing fasteners needed to form a frame, and the process is simplified of assembling tubes into a frame.

Figure 2:
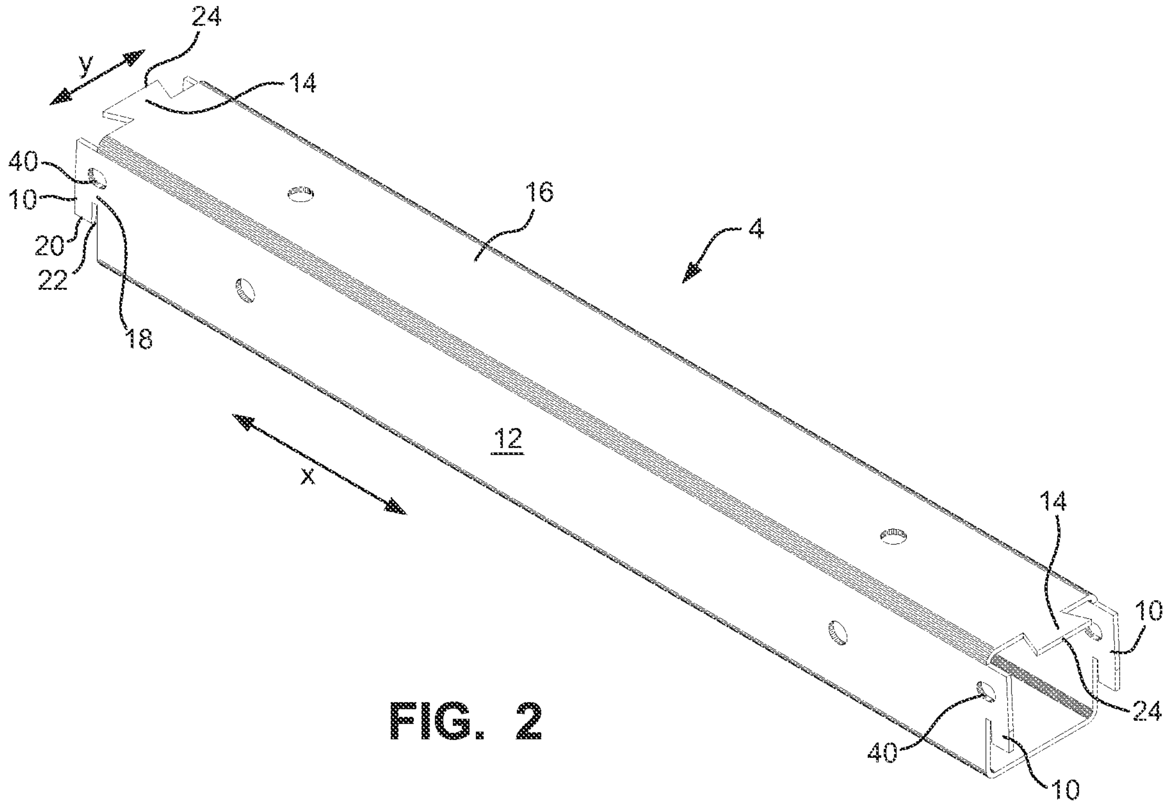
FIG. 2 shows an X axis tube with hooks cut into the sides and a wedge-shaped cut at the top

FIG. 2 shows an X axis tube 4 with hooks 10 cut into the sides 12 of the tube. A pair of hooks are at each end of tube 4. The sides and hooks are oriented along a vertical Y direction. A wedge 14 is formed at each end of the X axis tube. The wedges extend in a horizontal plane from a top wall, e.g., upper side, 16 of the X axis tube. Each wedge 14 is between, e.g., centered, between the hooks of a pair of hooks along the Y-direction. The wedge is a male member of an interlocking male-female joint. The female member 30 is a wedge-shaped cutout in the Y axis tube sized to receive the wedge from the X axis tube.

The hooks and wedges are fastening features and are configured to engage matching fastening features of a Y axis tube 6. The hooks 10 may be offset towards the top surface 16 of the X axis tube. Base 18 of the hook extends from an end of the side 12 of the X axis tube. A lip 20 of the hook extends downward. Slot 22 extends upward from the lower edge of the lip partially through the base of the hook.

The wedge 14 may have an outer edge 24 that is the widest portion of the wedge and is aligned with the outermost edge of the hooks.

Figure 3:
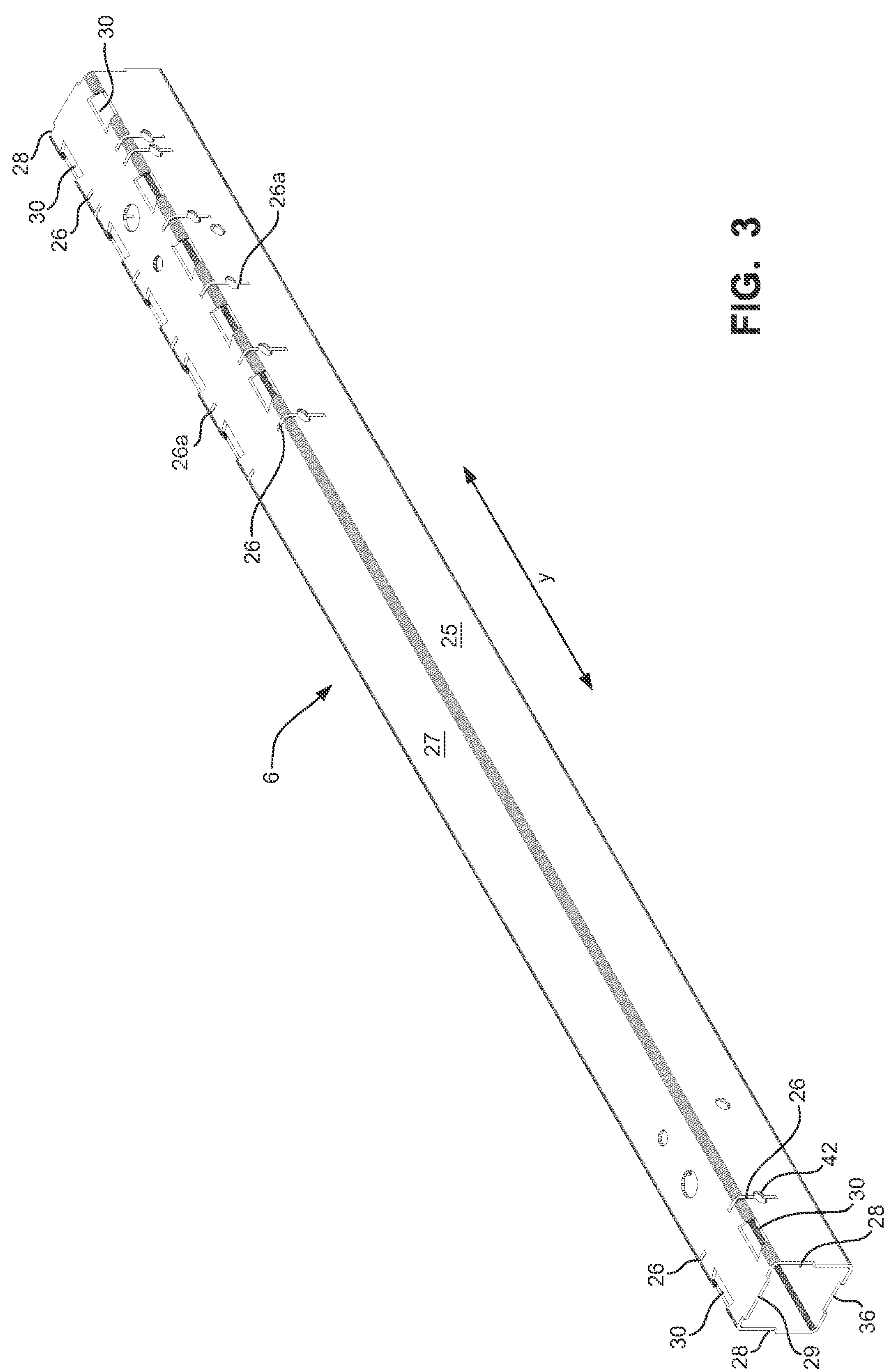
FIG. 3 shows a Y axis tube with slots cut into the sides for the hooks and the wedge-shaped cut at the top to receive the X Tube

FIG. 3 shows a Y axis tube 6 with slots 26, 28 cut into the sides for the hooks of a Z axis tube. The Y axis tube also has a wedge shape cutout 30 at the top to receive the X tube.

The end slots 28 are each a recess at an end of the Y axis tube 6. The recess of the end slot 28 extends vertically upward along a portion, e.g., one-half the height, of a side of the tube, through a rounded corner between the side and top surface and partially along the top surface, e.g., one third the width, of the Y axis tube. The end slot 28 is open on one side along a vertical plane formed by the outermost edges 29 of the Y axis tube.

The interior slots 26 are formed away from the ends of the Y axis tube. The slots are oriented vertically and extend upward along a portion, e.g., one-half a height, of a side of the Y axis tube, through a corner between the side and top surface, and partially, e.g., one-third, a width of the top surface. The slots form a gap having a width slightly wider than the thickness of the lip a corresponding hook on the X axis tube that will engage the slot 26.

The wedge-shaped cutout 30 is formed between a pair of slots 26, 28. If the wedge-shaped cutout 30 is near end 31 of the Y axis tube, the cutout is between end slot 28 and an interior slot 26.

Figure 4:
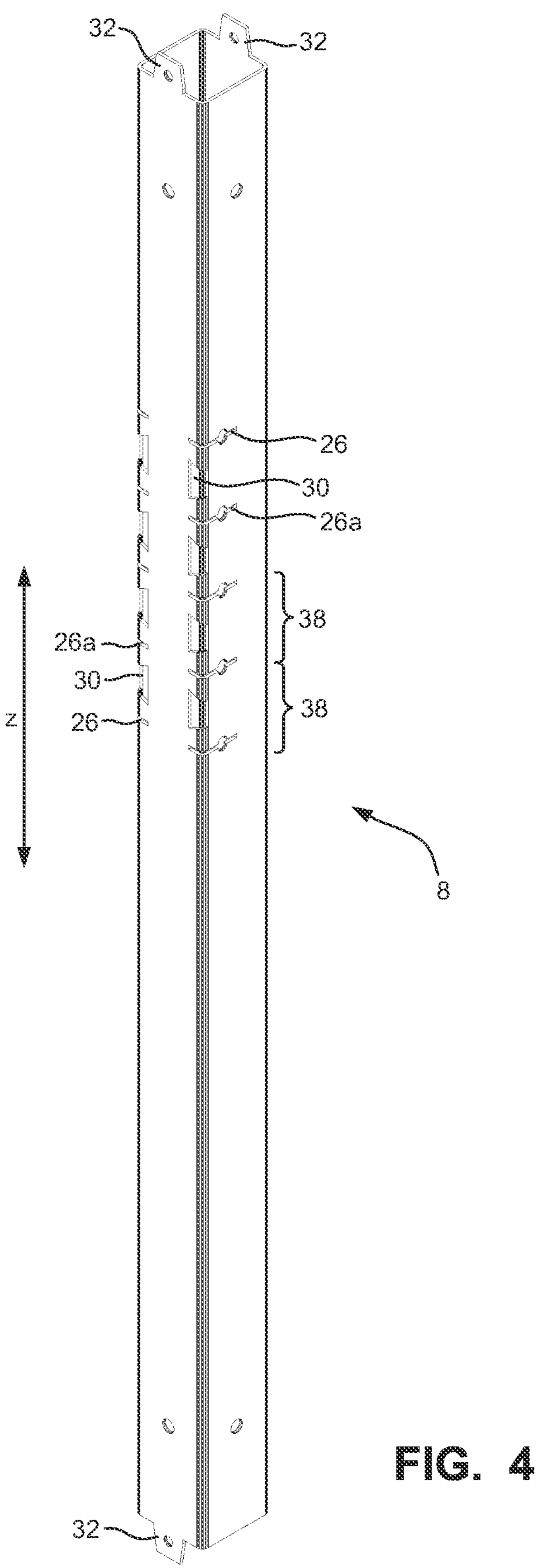
FIG. 4 shows a Z axis tube for vertical support.

FIG. 4 shows a Z axis tube 8 for vertical support of the frame unit 2. The Z axis tube extends vertically when assembled in the frame unit. One or both ends of the Z axis tube includes tabs 32 configured to be inserted into tab slots 34, 36 on the Y axis tube 6. The tabs 32 are each on a respective one of a front wall and back wall of the Z axis tube. The tabs may be laser cut by cutting away material at the end of the Z axis tube.

Tab slot 36 is at the end 31 of the Y axis tube and may be a laser cut recess in an edge of the lower wall of the tube. Tab slot 34 may be a laser cut slot in the lower wall spaced from the tab slot 36 by the width of the z axis tube.

Groups 38 of a wedge cutout 30 and interior slots 26 may be laser cut into the Z axis tube at various elevations of the tube. Groups 38 allow an X axis tube 4 to be mounted to the Z axis tube at the elevation of the group. The X axis tube would extend horizontally between opposite Z axis tubes. Adjacent groups 38 may share common interior slots 26.

Figure 5:
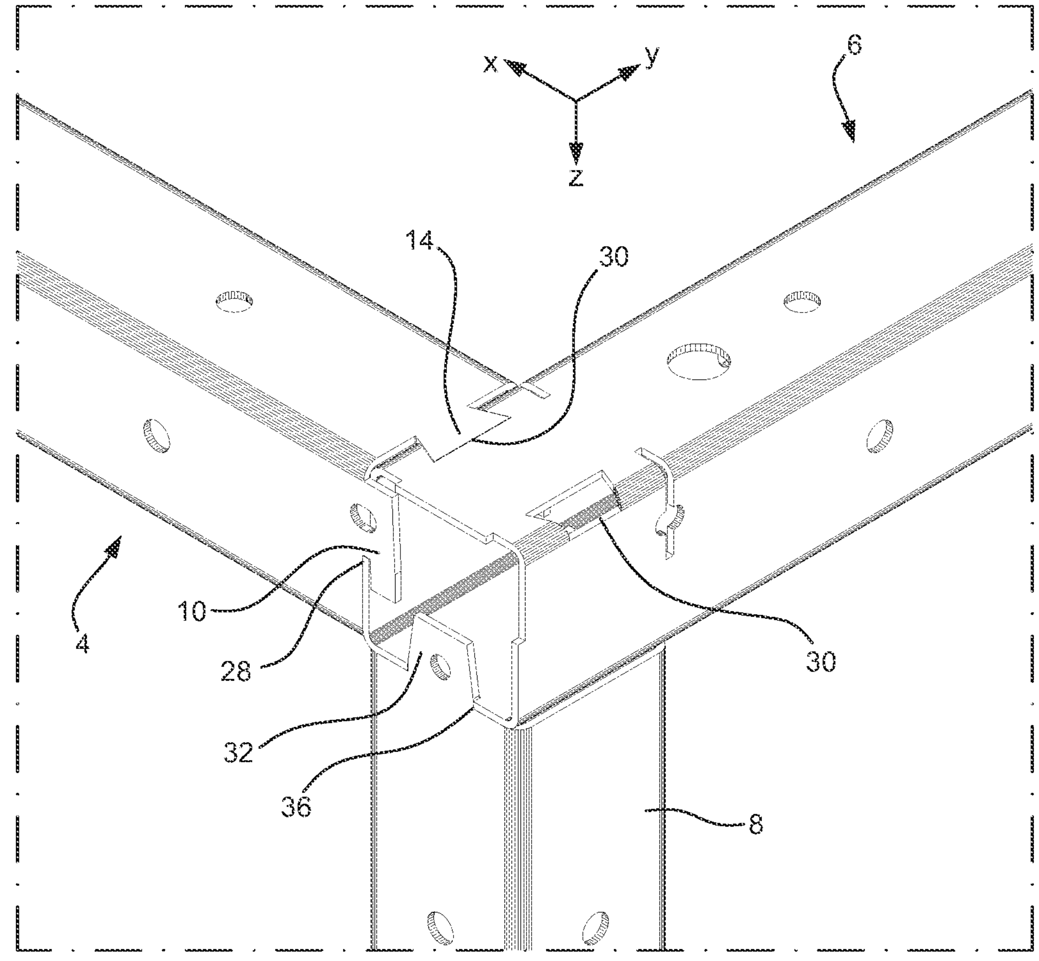
FIG. 5 is a first perspective view of a joint of X, Y and Z axis tubes.

FIG. 5 is a first perspective view of a joint of X, Y and Z axis tubes. FIG. 5 shows hook 10 of the X axis tube 4 in an end slot 28 of a Y axis tube 6, and a wedge 14 of the X axis tube in a wedge cutout 30 of the Y axis tube. The figure also shows tab 32 of the Z axis tube 6 in tab slot 36 at the end of the Y axis tube. FIG. 5 illustrates how the interlocking of the hooks, slots, wedges, wedge slots, tabs and tab slots forms a joint between X, Y and Z axis tubes.

Figure 6:
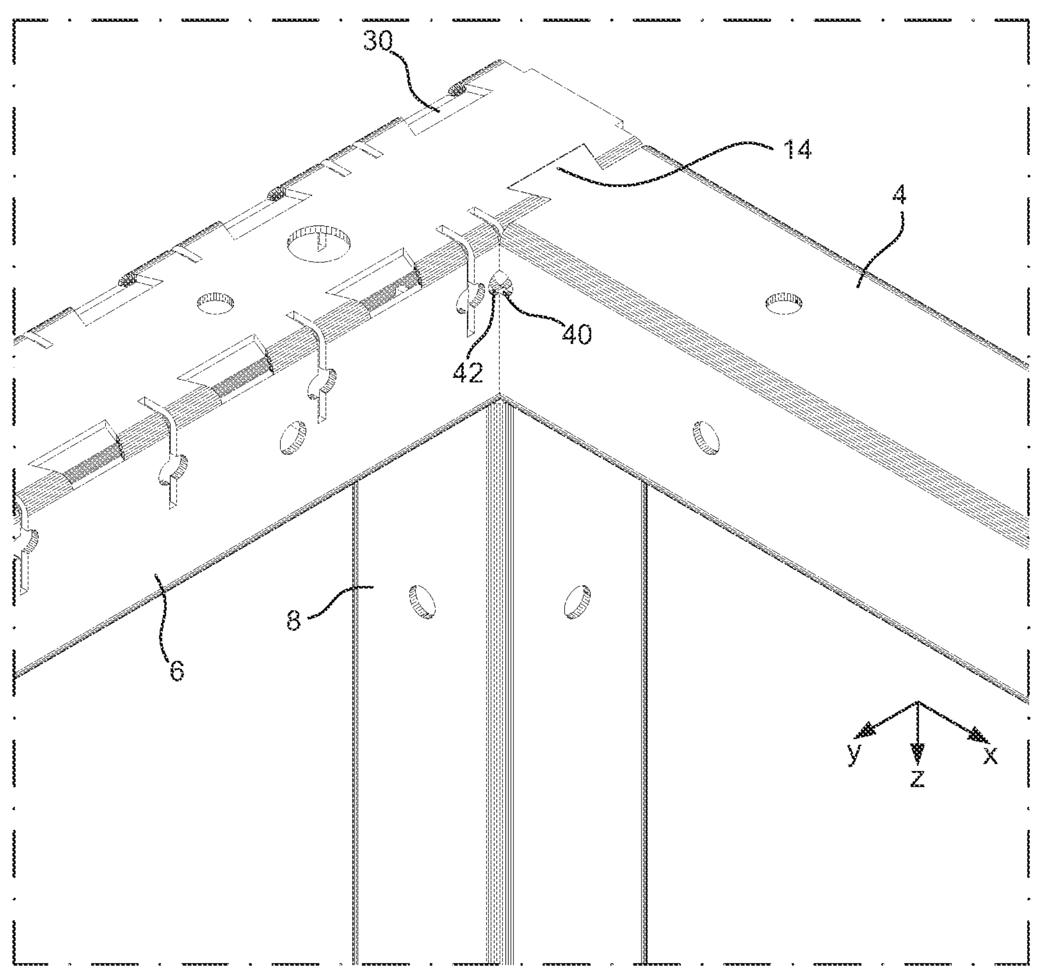
FIG. 6 is a second perspective view of the joint of X, Y and Z tubes shown in FIG. 5.

FIG. 6 is a second perspective view of the joint of X, Y and Z tubes shown in FIG. 5. FIG. 6 also shows apertures 40, 42 align when the X axis tube is interlocked with the Y axis tube to receive a fastener. Aperture 40 on the X axis tube is at the base 18 of a hook 10. Aperture 42 on the Y axis tube is integral with an interior slot 26 and on a side wall 25 of the tube. The apertures 40, 42 may be circular.

Figure 6A:
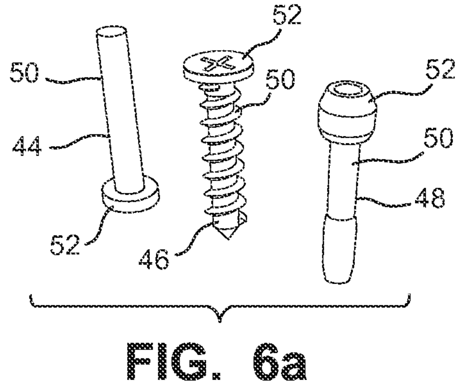
FIG. 6*a* shows exemplary fasteners, e.g., a pin, a screw and a pop rivet, used in the joint.

FIG. 6*a* shows exemplary fasteners, e.g., a pin 44, a screw 46, and a pop rivet 48. These fasteners are inserted into the aligned apertures 40, 42 of the X and Y tubes. Each of the fasteners extends through the aligned apertures 40, 42. Each fastener may include a shaft 50 and a head 52. The shaft is inserted into the aligned apertures. The diameter R1 of the shaft is configured to fit into the aligned apertures.

Figure 7:
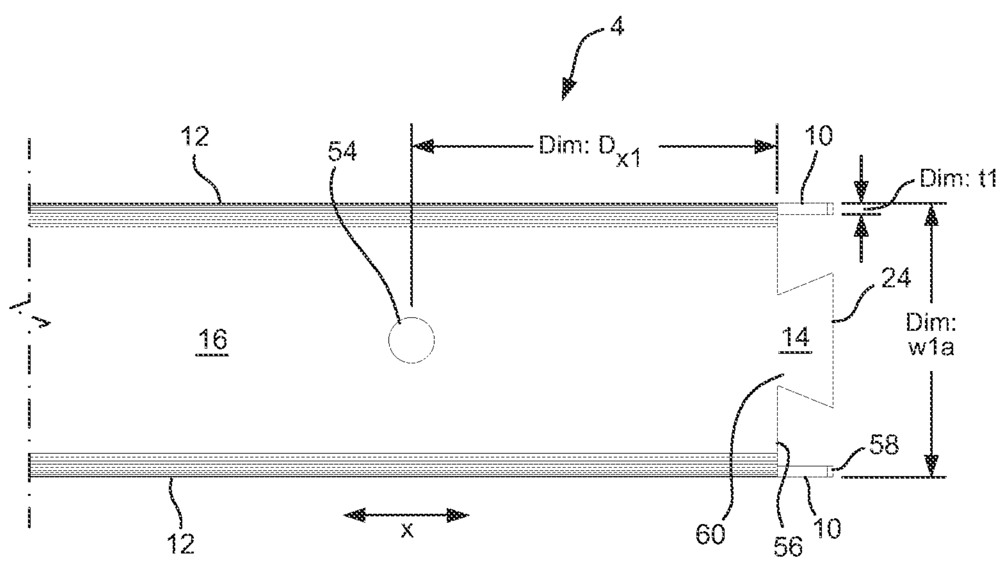
FIG. 7 is a view of a top of an end region of X axis tube which illustrates a locking wedge and aperture for a fastener.
Figure 9:
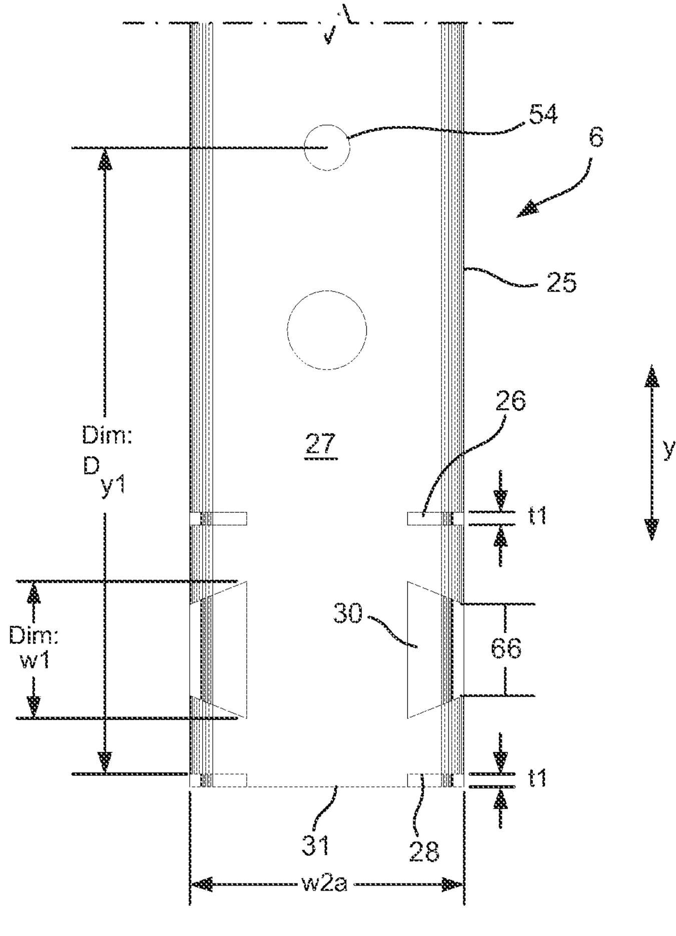
FIG. 9 is a view of a top of an end region of a Y axis tube which illustrates slots to receive a locking wedge and hooks.
Figure 15:
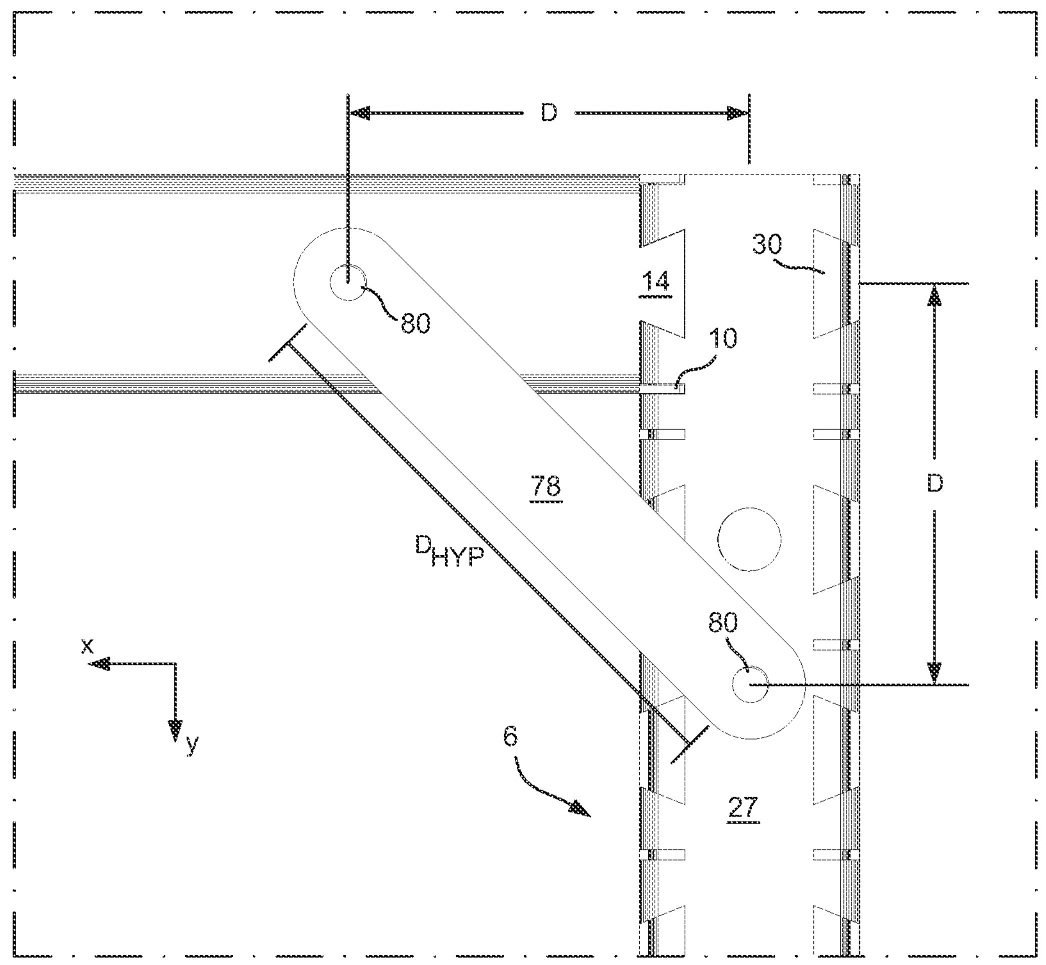
FIG. 15 shows the bracket connecting to joined X and Y axis tubes.

FIG. 7 is a view of an upper wall 16 of an end region of X axis tube 16 and illustrates a locking wedge 12 and bracket aperture 54 to receive a fastener for a bracket spanning two joined tubes. The aperture 54 has a diameter R1 that corresponds to the shaft diameter of the fastener. The center of bracket aperture 54 on the upper wall 16 is spaced from an end 56 of the X axis tube by a distance Dx1. Dx1=D+(0.5)W2A. D is shown in FIG. 15, and W2A is shown in FIG. 9.

The hooks 10 are symmetrical about a Z axis and arranged on opposite sides 12 of the X axis tube. The thickness t1 of each hook corresponds to the thickness of the material forming the X axis tube. The width w1*a* of the X axis tube corresponds to the width of the tube between opposing sides 12 of tube. The thickness and width of the Y axis and Z axis tubes may or may not be the same as the thickness t1 and the width w1*a* of the X axis tube.

The outermost edge 24 of wedge 14 may extend beyond the end 56 of the X axis tube by the same distance as does the outermost edge 58 of each of the hooks 10. The wedge may be shaped as a trapezoid as shown in FIG. 7. The wedge may also have a bulbous shape or other shape that is wider than a neck region 60 of the wedge. A narrow neck region 60 is helpful to allow the wedge to lock into a wedge cutout 30 of a Y axis tube 6.

Figure 8:
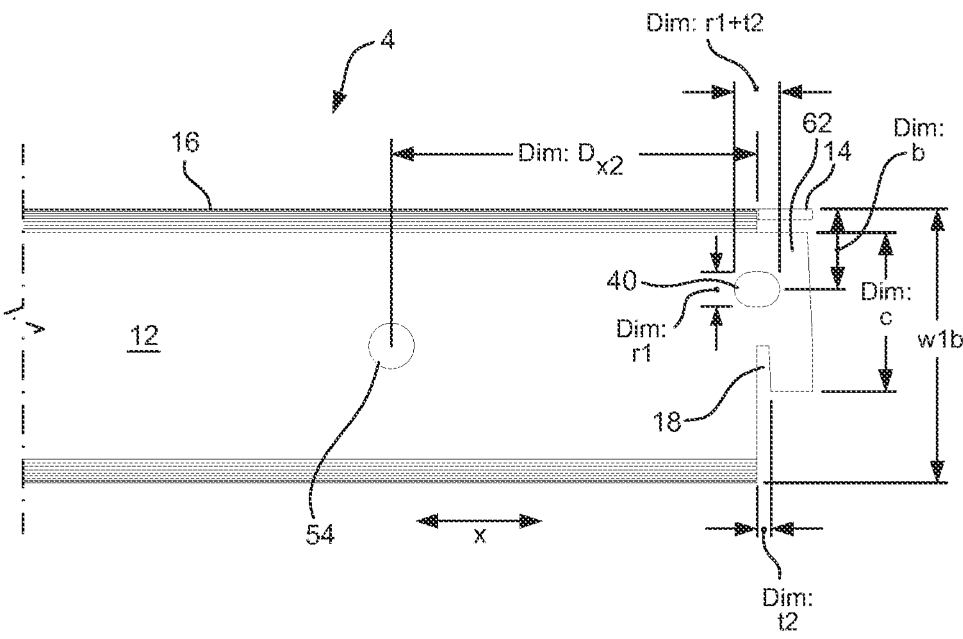
FIG. 8 Is a side view of an X axis tube which illustrates a hook.

FIG. 8 is a side view of an X axis tube 4 shown in FIG. 7 and illustrates a hook 10 of the Y axis tube. The hook includes a base 18 that is integral and extends from the end of the X axis tube, and a lip 20 that extends down from the base. The upper edge 62 of the hook is aligned with the side 12 of the tube and slightly below the curvature of the tube between the side and the upper wall 16.

The lip 20 extends downward to between one-half to two-thirds, for example, the height w1*b* of the X axis tube. A gap 64 between the end 56 of the X axis tube and the lip has a width t2 that corresponds to the thickness of the material forming the Y axis tube. The height c of the hook may be one-half to two-thirds the height w1*b* of the X axis tube. Hook 10 fits into a slot of the Y axis tube such that the gap receives a portion of the Y axis tube and secures the X and Y axis tubes together.

The aperture 40 in the X and Y axis tubes may have a racetrack shape. The radius r1 of the ends of the aperture corresponds to the diameter of the fastener which will be inserted into the aperture. The length r1 plus t2 of the aperture allows for the fastener to be inserted when the apertures are aligned at 90 degrees by X and Y axis tubes to be joined. The center of the aperture 40 is a distance b from the upper wall 16. The distance may be selected to center the aperture on the base of the hook.

The bracket aperture 54 on side 12 of the X tube is a distance (D×2) from the end 56 of the tube that is equal to D+(0.5)W2A.

FIG. 9 is a view of the upper wall 27 of an end region of a Y axis tube 6 which illustrates slots 26, 28 to receive hooks from an X axis tube and wedge cutouts 30 to receive wedges of the X axis tube. The slots 26, 28 have a width t1 corresponding to the thickness of each hook on the X axis tube. The slots receive the hooks when the X axis tube is joined with the Y axis tube.

The wedge cutout 30 has a maximum width w1 that is wider than the neck region 66 of the cutout. The neck region is aligned with the side 25 of the Y axis tube. The shape of each wedge cutout conforms with a corresponding wedge of the X axis tube. The wedge cutout receives the corresponding wedge when the X axis tube is joined with the Y axis tube.

The distance Dy1 from the end 31 of the tube to the bracket aperture 54 on side 27 of the Y axis tube is equal to D minus (−) one-half (0.5)W1A.

Figure 10:
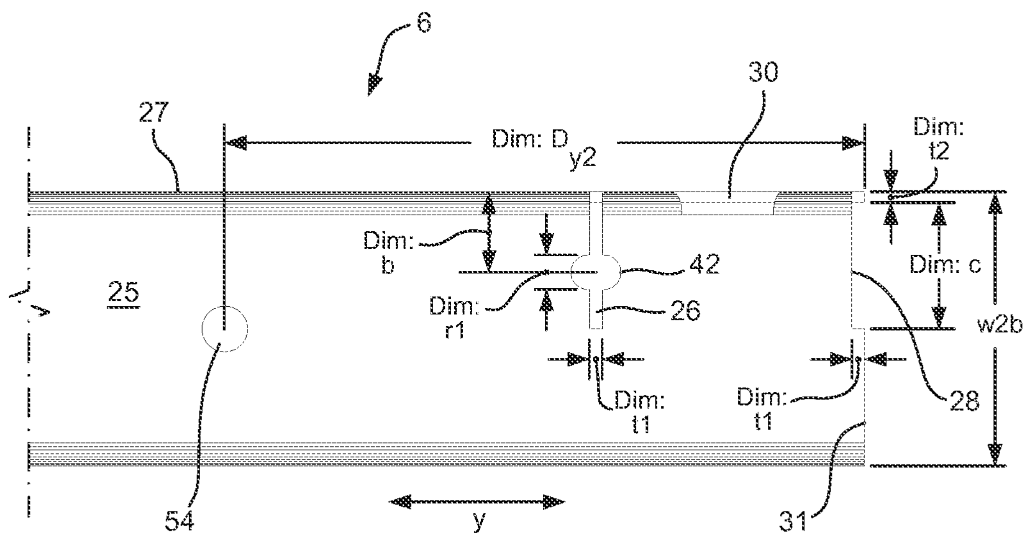
FIG. 10 is a view of the side of the end region of the Y axis tube shown in FIG. 9 and illustrates the slots to receive the locking wedge and hooks.

FIG. 10 is a view of the side of the end region of the Y axis tube 6 shown in FIG. 9 and illustrates the slots 26, 28 to receive the locking wedge and hooks. The slots 26, 28 form a gap or recess having a width substantially equal to the thickness t1 of the material forming the X axis tube.

Aperture 42 in the interior slot 26 is configured to receive a fastener after the X and Y axis tubes are joined together. Slot 26 extends through the aperture.

The distance Dy2 from the end 31 of the Y axis tube to the bracket aperture 54 is equal to D−(0.5)(W2B).

Figure 11:
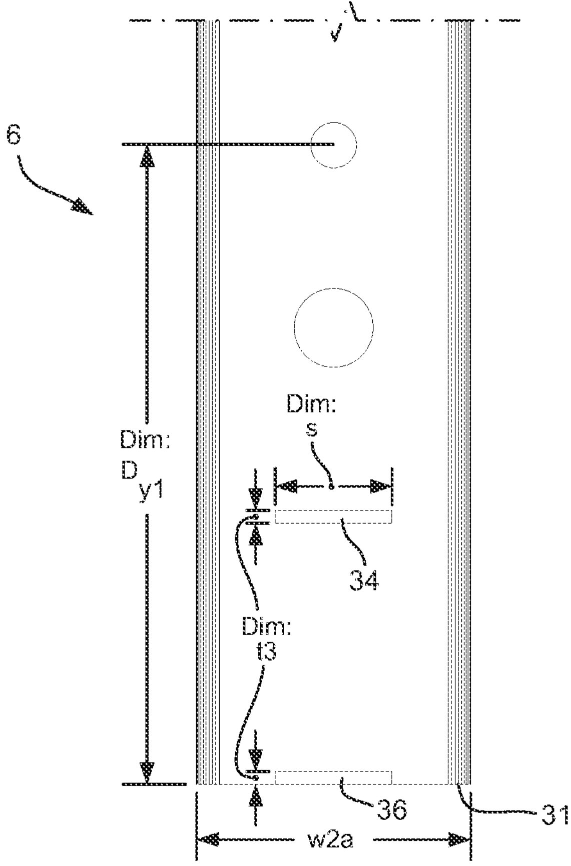
FIG. 11 is a view of the bottom of the end region of the Y Tube shown in FIG. 9 and illustrates slots to receive tabs of a Z-axis tube.

FIG. 11 is a view of the bottom of the end region of the Y axis tube 6 shown in FIG. 9 and illustrates slots 34, 36 to receive tabs of a Z-axis tube. The width t3 of the slots 34, 36 are substantially the same as the thickness of the tabs. The interior slot 34 is a distance from the end of the Y axis tube substantially the same as the width w3*b* of the Z axis tube between the opposing tabs.

The distance Dy1 from the end 31 of the Y axis tube to the bracket aperture 54 is equal to D−(0.5)(W1B).

Figure 12:
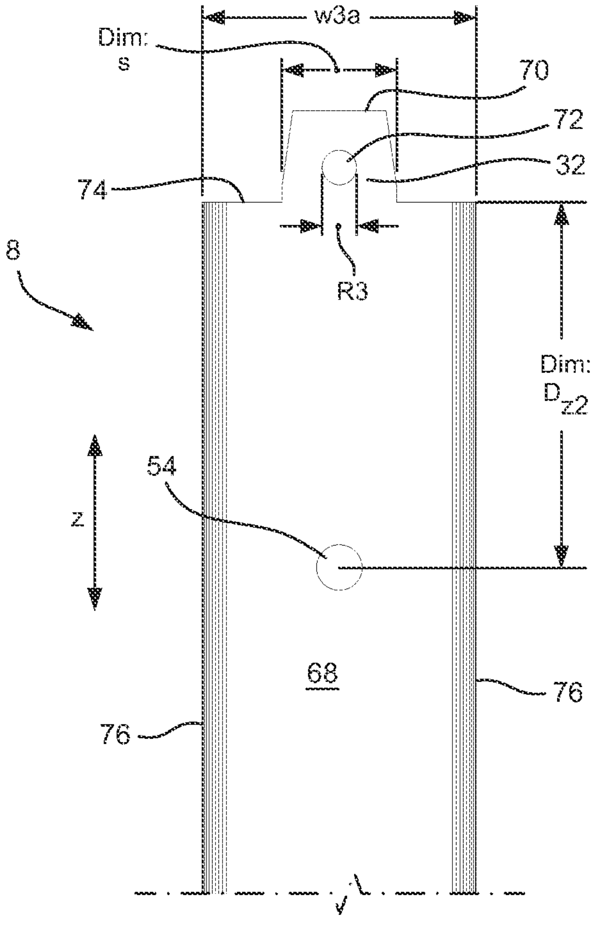
FIG. 12 is a view of a front portion of a Z axis tube and illustrates tabs received by the slots shown in FIG. 11.

FIG. 12 is a view of a front of an upper portion of the Z axis tube 8 and illustrates tabs 32 received by the slots in the bottom of the Y axis tube shown in FIG. 11. The tabs 32 are on front 68 and rear sides of the Z axis tube. The tabs have a maximum width s and may taper towards an upper or lower edge 70. The width w3*a* of the Z axis tube is between opposing sides 76 of the tube.

A tab aperture 72 may be in each tab to receive a locking fastener, such as a pin that extends through one or both tabs on an end of the Z axis tube. The radius R3 of the tab aperture is substantially the diameter of the fastener configured to be inserted into the aperture. The tab aperture may be centered on the tab.

The distance of Dz2 from the end 74 of the Z axis tube to the bracket aperture 54, is equal to D plus one-half (0.5) W2B, which is the height of the Y axis tube.

Figure 13:
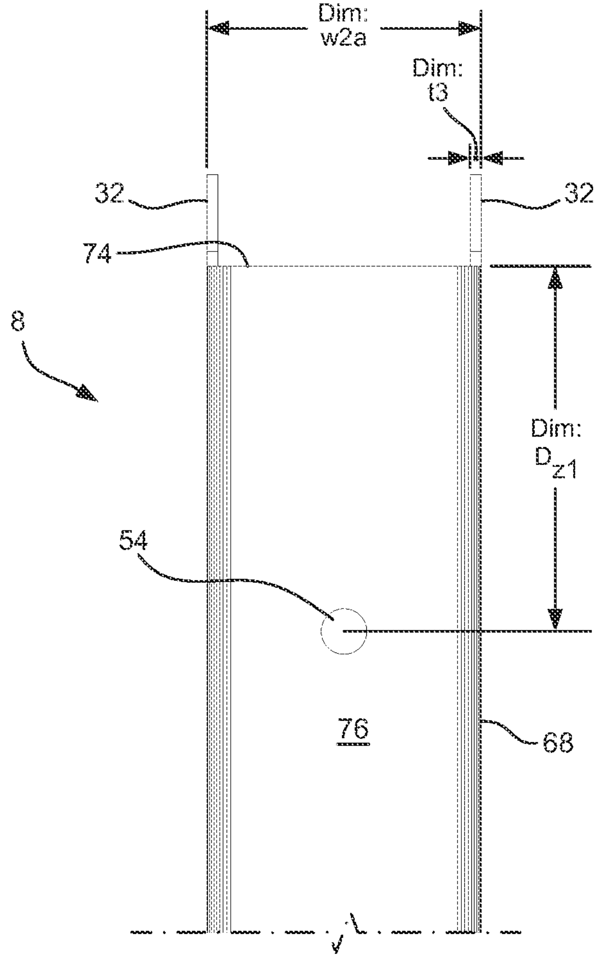
FIG. 13 is a view of a side of the portion of the Z axis tube shown in FIG. 13.

FIG. 13 is a view of a side of the portion of the Z axis tube 8 shown in FIG. 13. The width w3*b* of the tabs 32 may be the same as the thickness of the material that forms the Z axis tube.

The distance of Dz1 from the end 74 of the Z axis tube to the bracket aperture 54, is equal to D plus one-half (0.5) W2B.

The thicknesses t1, t2 and t3 may be substantially equal, especially if the X, Y and Z axis tubes are formed of the same material and have the same material thickness. Similarly, the widths w1*a*, w1*b*, w2*a*, w2*b*, w3*a* and w3*b* may be substantially equal, especially if the X, Y and Z axis tubes are substantially square with rounded corners in cross section.

Figure 14:
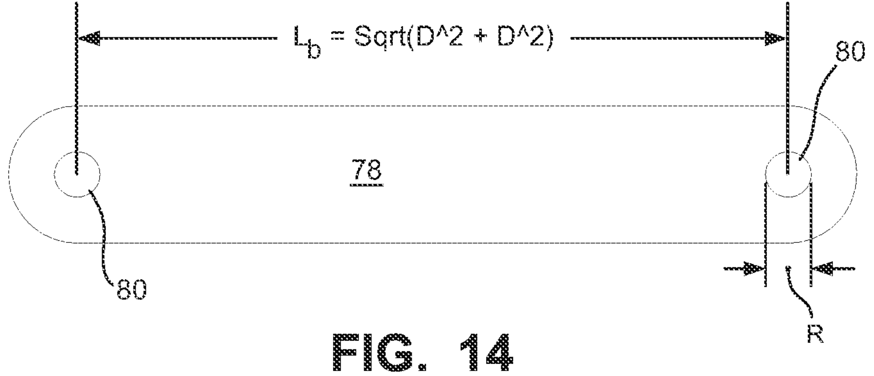
FIG. 14 shows a bracket used for stabilizing the joint of the Z, X and Y axis tubes.
Figure 14A:
FIG. 14*a* shows an edge view of the bracket in FIG. 14.

FIGS. 14 and 14*a* show a bracket 78 configured for stabilizing joints of the Z, X and Y axis tubes. The bracket has bracket apertures 80 configured to receive fasteners that secure the bracket to the tubes. Bracket aperture 80 may have a diameter R substantially the same as the diameter R of the bracket apertures 54 in the tubes. The distance $L_b$ between the bracket apertures 80 on a bracket may be calculated by the Pythagorean Theorem: $L_b^2=D^2+D^2$, where D is the distance between an end of the tube and the bracket aperture 54 on the tube. The thickness t4 of the bracket may be similar to the thickness of the material forming the X, Y and/or Z tubes.

FIG. 15 shows bracket 78 securing the joints between X and Y axis tubes. The bracket is attached to the upper walls 16, 27 of the tubes. Fasteners are inserted through the bracket apertures to secure the bracket to each of the tubes. When fastened, bracket 78 stiffens the joint between the X and Y axis tubes and ensures that the tubes a remain at a ninety-degree angle with respect to each other.

Figure 16:
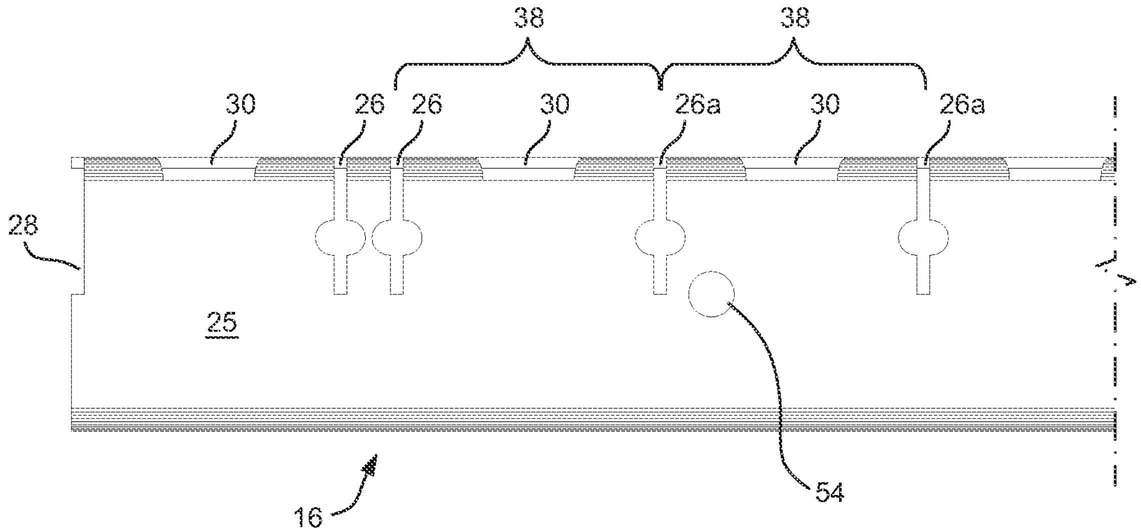
FIG. 16 is a side view of an end portion of a Y axis tube and illustrates slots for hooks and wedges in an end portion of a Y axis tube.

FIG. 16 is a side view of an end portion of a Y axis tube 16 and illustrates slots 26, 28 for hooks and wedge cutouts 30 in an end portion of the Y axis tube. Groups 38 of a wedge cutout and opposing slots 26 may be arranged at various locations along the length of the Y axis tube. Providing groups 38 allows for X axis tubes to be mounted to the Y axis tubes at selected locations along the length of the Y axis tube. If the groups 38 are immediately adjacent, they may share slot 26*a*.

Figure 17:
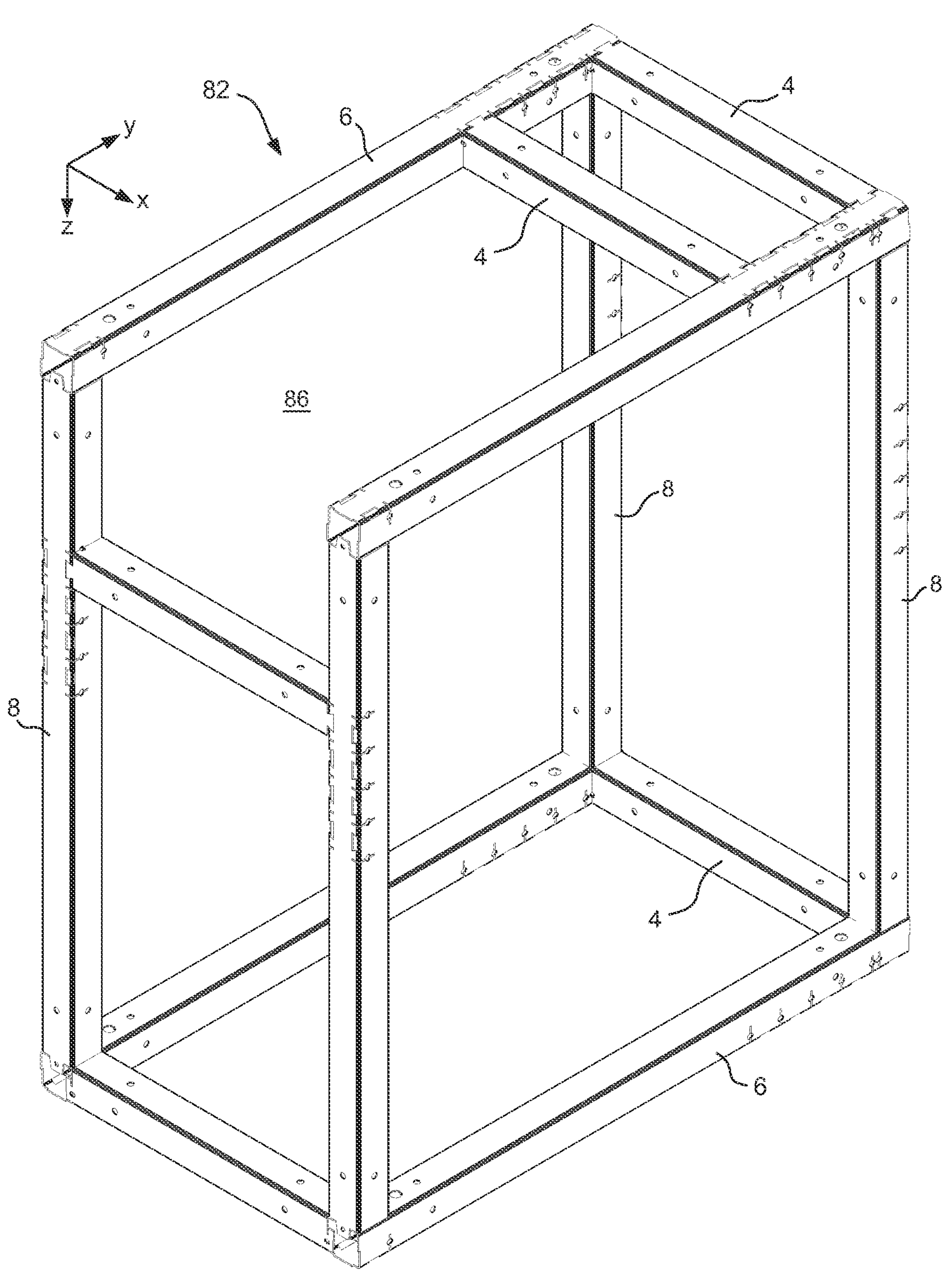
FIG. 17 is a perspective view of a first exemplary frame formed by X, Y and Z axis tube.

FIG. 17 is a perspective view of an exemplary first frame 82 formed by X, Y and Z axis tubes. The first frame illustrates how the tubes may be arranged to form a rigid frame for an outdoor cooking/grilling unit. A grill or stove (not shown) may be inserted in a region 86 of the frame. Other regions of the frame may support surfaces for placing raw or cooked food. Side panels (not shown may be mounted to the side of the first frame. Also, brackets (not shown) may be applied to the tubes as needed to provide support for selected joints between tubes.

Figure 18:
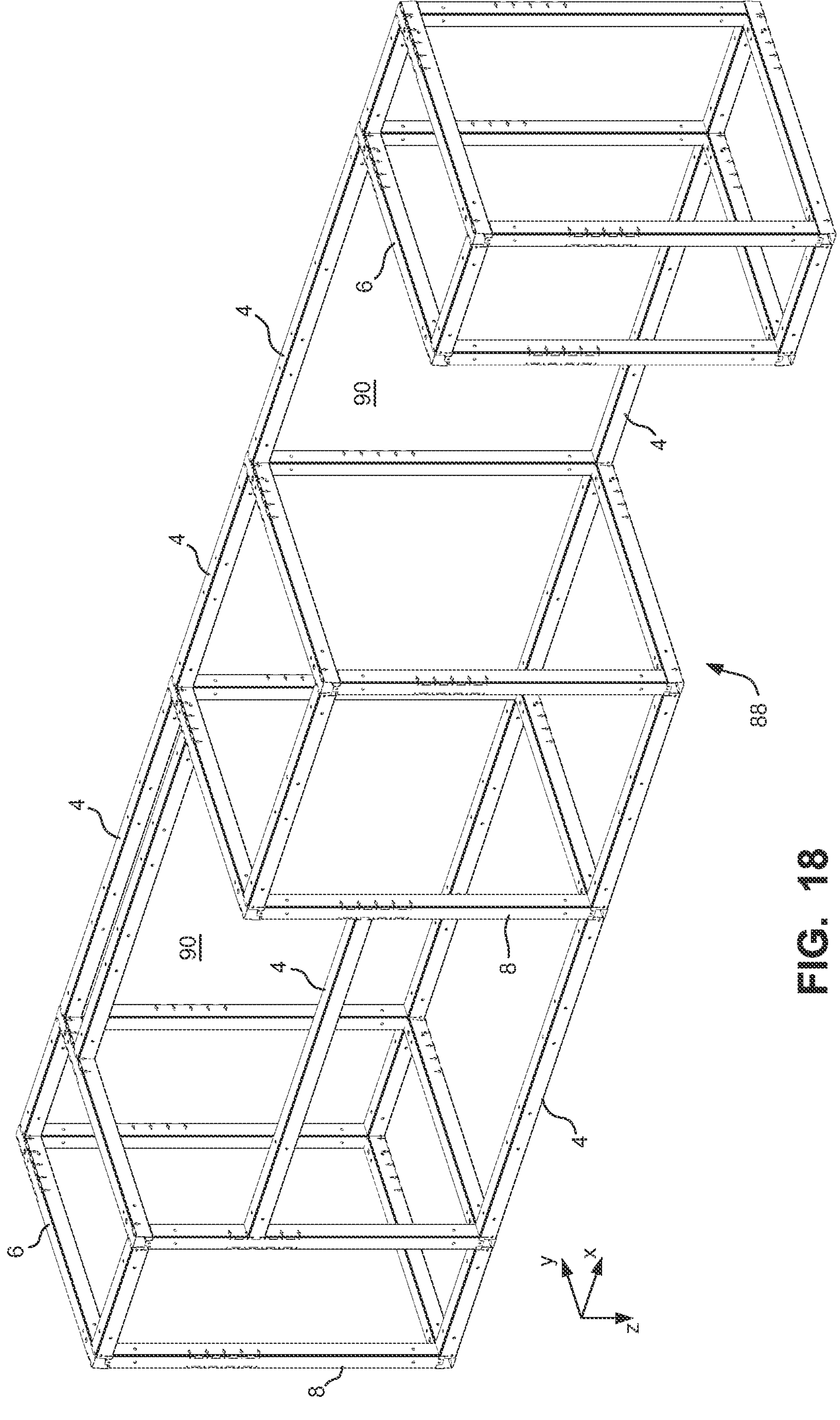
FIG. 18 is a perspective view of a second exemplary frame formed by X, Y and Z axis tube.

FIG. 18 is a perspective view of a second frame 88 formed by X, Y and Z axis tubes. The length of second frame 88 is extended by arranging several X axis tubes 4 end to end. The X axis tubes are joined by a Y axis tube 6. Z axis tubes 8 extend down from the ends of the Y axis tubes. Brackets may be attached to the joints formed by X, Y and Z axis tubes. The tubes may be arranged to provide open regions 90 into which may be inserted or formed cooking grills/stoves/ovens, seating areas or other structures. Decorative side panels may be mounted to the sides and upper regions of the second frame to cover the frame and provide additional stiffness to the frame.

The frames, e.g., first and second frames 82, 88, may be fabricated by select X, Y and Z axis tubes that are suitable for the intended purpose of the frames. Knowing the intended purpose will allow a skilled person to determine the loads to be placed on the frames and the stiffness needed for the frame. With this information, the material, thickness and dimensions, e.g., length and cross-sectional dimensions, of the tubes can be selected. The skilled person will also determine the arrangement of the tubes, wherein exemplary arrangements are shown in FIGS. 17 and 18.

Once the tubes are selected and there is a plan for the arrangement of the tubes, the tubes can be assembled by inserting the hooks and wedges of X axis tubes into slots and wedge cutouts of Y axis tubes. If the frame is two-dimensional (2D), the frame may be formed by only X and Y axis tubes. A fastener is inserted into the aligned apertures to secure the joint formed by the X and Y axis tubes.

If the frame is three dimensional (3D), the frame will include X, Y and Z axis tubes. Z axis tubes are attached to Y axis tubes by inserting the tabs on the Z axis tubes into slots on the bottom of the Y axis tubes. After the joints are formed, brackets are attached to the tubes adjacent the joint to stiffen the joint.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS USED IN THE FIGURES

2 Frame unit
4 x-axis tube
6 y-axis tube
8 z-axis tube
10 Hooks
12 Side of x-axis tube

14 Wedge
16 Top/upper wall
18 Base of hook
20 Lip of hook
22 Slot of hook
24 Outermost edge of wedge
25 Side wall of Y axis tube
26 Interior Slots in Y axis tube
26*a* Shared slot
27 Top wall of Y axis tube
28 End Slots in the end of Y axis tube
29 Outermost edge of Y axis tube
30 Wedge cutout
31 End of y axis tube
32 Tabs on Z axis tube
34 Tab slot on y axis tube
36 Tab slot at end of y axis tube
38 Group of a wedge cut out and interior slots
40 Aperture on X axis tube
42 Aperture on Y axis tube
44 Pin
46 Screw
48 Pip rivet
50 Shaft
52 Head
54 Bracket aperture
56 End of X axis tube
58 Outermost edge of hook
60 Neck region of wedge
62 Upper edge of hook
64 Gap between hook lip and end of tube
66 Neck region of cutout
68 Front of Z axis tube
70 Lower/upper edge of tab
72 Tab aperture
74 End of Z axis tube
76 Side of Z axis tube
78 Bracket
80 Bracket apertures
82 First frame
86 Region of frame for grill/stove
88 Second frame
90 Open regions
B Distance between upper wall of X axis tube and fastener aperture
C Height of hook/depth of slot
D Length of sides of right angle triangle formed by bracket and tubes to which the bracket is connected. The dimension D may be uniform for tubes which allows for a uniform bracket to join all tubes.
Dhyp Length of hypotenuse of right angle triangle formed by lengths D, where $$Dhyp^2 = D^2 + D^2.$$

Dx1 Distance from end of X axis tube to bracket aperture for bracket connected to Y axis tube. Dx1=D+(0.5) W2A.
Dx2 Distance from end of X axis tube to bracket aperture for bracket connected to Z axis tube. Dx2=D+(0.5) W1B.
Dy1 Distance from end of Y axis tube to bracket aperture for bracket connected to X axis tube. Dy1=D−(0.5) W1A.
Dy2 Distance from end of Y axis tube to bracket aperture for bracket connected to Z axis tube. Dy2=D−(0.5) W2B.
Dz1 Distance from end of Z axis tube to bracket aperture for bracket connected to Y axis tube. Dz1=D+(0.5) W2B.
Dz2 Distance from end of Z axis tube to bracket aperture for bracket connected to X axis tube. Dz2=D+(0.5) W2B.
R1 Diameter of bracket aperture
S Width of tab of z axis tube
t1 Thickness of hook/material of X axis tube; gap of slot in Y axis tube
t2 Thickness of material forming Y axis tube/gap formed by lip of hook
T3 Thickness of tab/gap for slot 36 for tab of Z axis tube
W1 Maximum width of wedge cutout
W1*a* Width of X axis tube (across upper wall)
W1*b* Height of X axis tube (across side)
W2*a* Width of Y axis tube (across upper wall)
W2*b* Height of Y axis tube (across side)
W3*a* Width of z axis tube (front to back)
W3*b* Width of z axis tube (side to side)

The invention claimed is:

1. A framing system comprising:

a first hollow tube with a longitudinal end from which extends opposing hooks and a male member between the opposing hooks, and a second hollow tube having opposing slots arranged to receive the opposing hooks of the first hollow tube and a female member between the opposing slots, wherein the female member is configured to receive the male member, wherein the opposing hooks include a first hook and a second hook;

wherein the opposing slots include an end slot formed by a cutout in a longitudinal end of the second hollow tube and a second slot, and wherein the end slot is configured to receive the first hook.

2. The framing system of claim 1, further comprising a third hollow tube including a first end with a tab, wherein the second hollow tube includes a bottom wall with a tab slot configured to receive the tab, wherein the tab and the bottom wall with the tab slot both extend longitudinally along the third hollow tube and the second hollow tube, respectively.

3. The framing system of claim 1, wherein each of the slots forms a gap in the second hollow tube having a width corresponding substantially to a thickness of the hook configured to fit into the slot.

4. The framing system of claim 1, wherein the first hollow tube and the second hollow tube are substantially rectangular in cross section with rounded corners.

5. The framing system of claim 1, wherein the male member has a first trapezoidal shape which expands in a direction away from the first hollow tube and towards the second hollow tube, and the female member forms an opening in the second hollow tube having a second trapezoidal shape configured to receive the first trapezoidal shape.

6. The framing system of claim 1, further comprising a first aperture in the second hook and a second aperture in the second slot, which is configured to receive the second hook, wherein the first aperture and the second aperture align when the second hook is in the second slot, and wherein the first aperture and the second aperture, when aligned, form an opening configured to receive a locking fastener.

7. The framing system of claim 6, wherein the first aperture has an oval shape.

8. The framing system of claim 6, wherein the first aperture and the second aperture each has a dimension in a direction of an axis of the corresponding first hollow tube or second hollow tube, wherein the dimension is substantially equal to a diameter of the locking fastener plus a thickness of one of the hooks, the end slot including:

an open side aligned with the longitudinal end of the second hollow tube, and a closed side formed by the cutout in the longitudinal end of the second hollow tube.

9. The framing system of claim 1, wherein the second hollow tube includes:

the opposing slots and the female member being adjacent the longitudinal end of the second hollow tube wherein the opposing slots partially extend through a first side of the second hollow tube, and a second set of slots and a second female member being adjacent the longitudinal end of the second hollow tube wherein the second set of slots partially extend through a second side of the second hollow tube, the second side is opposite to the first side, and the second set of slots and the second female member are mirrored opposite to the opposing slots and the female member.

10. The framing system of claim 1, wherein: the opposing slots and the female member extend through a first side of the second hollow tube, and wherein the second hollow tube includes a third slot and a second female member that partially extends through the first side of the second hollow tube, wherein the second female member being positioned between the second slot and the third slot, wherein the opposing slots form a first set of slots, and wherein a second set of slots is formed by the second slot and the third slot.

11. The framing system of claim 1, wherein an outer surface of the first hook of the first hollow tube and a portion of the end of the second hollow tube are aligned in a plane when the first hook is within the end slot, wherein the portion of the end does not include the recess.

12. The framing system of claim 1, wherein the end slot is bordered on a first side by an edge of the second hollow tube and the end slot has a second side which is not bordered by the second hollow tube, and the second side is opposite to the first side.

13. A framing system comprising:

a first hollow tube having first opposing sidewalls and a first upper wall spanning the first opposing sidewalls, wherein an end of the first hollow tube includes a pair of opposing hooks each extending from a respective one of the opposing sidewalls and a first portion of an interlocking joint extending from the upper wall;

a second hollow tube including second opposing sidewalls and a second upper wall spanning the second opposing sidewalls, the second hollow tube includes opposing slots each extending partially through the second upper wall and partially down through a first sidewall of the second opposing sidewalls, wherein the opposing slots are separated by a gap corresponding to a gap between the hooks in the pair of opposing hooks and the opposing slots are configured to receive the opposing hooks, wherein a second portion of the interlocking joint is in the second upper wall and extends to the first sidewall, wherein the first portion and the second portion of the interlocking joint are configured to interlock to secure the first hollow tube to the second hollow tube while the opposing hooks engage the opposing slots, wherein the opposing hooks include a first hook and a second hook;

wherein the opposing slots include an end slot formed by a recess in an end of the second hollow tube and an interior slot spaced from the end slot and the end of the second hollow tube, and wherein the end slot is configured to receive the first hook.

14. The framing system of claim 13, further comprising a third hollow tube having an upper end with a tab extending from the upper end of the third hollow tube and parallel to a sidewall of the third hollow tube, wherein the tab fits into a tab slot in a bottom wall of the second hollow tube, and the tab and tab slot are in a common plane when the tab is within the tab slot.

15. The framing system of claim 13, wherein each of the slots forms a gap in the second hollow tube having a width corresponding substantially to a thickness of the hook configured to fit into the slot.

16. The framing system of claim 13, further comprising a first aperture in the second hook and a second aperture in the slot configured to receive the second hook, wherein the first aperture and the second aperture align when the second hook is in the slot, and wherein the first aperture and the second aperture, when aligned, form an opening configured to receive a locking fastener.

17. The framing system of claim 16, wherein the first aperture and the second aperture each have a dimension in a direction of an axis of the corresponding first hollow tube or second hollow tube, wherein the dimension is substantially equal to a diameter of the locking fastener plus a thickness of one of the hooks.

18. The framing system of claim 11, wherein the end slot includes:

an open side aligned with the end of the second hollow tube, and a closed side formed by the recess in the end of the second hollow tube.

19. The faming system of claim 13, wherein the second hollow tube includes:

the opposing slots and the second portion of the interlocking joint being adjacent the end of the second hollow tube, wherein the opposing slots partially extend through the first sidewall of the second opposing sidewalls of the second hollow tube, and a second set of slots and an additional second portion of the interlocking joint being adjacent the end of the second hollow tube wherein the second set of slots partially extend through a second sidewall of the second opposing sidewalls, and the second sidewall is opposite to the first sidewall.

20. A method to manufacture a framing system comprising:

laser cutting an end of a first hollow tube to remove material from the end to form opposing hooks extending from opposite sidewalls of the first hollow tube and a male member extending from an upper wall of the first hollow tube, wherein the opposing hooks include a first hook and a second hook;

laser cutting opposing slots into a second hollow tube, wherein the laser cuts each of the slots to extend partially through an upper wall of the second hollow tube and partially down through a sidewall of the second hollow tube, wherein the opposing slots include an end slot formed by a recess in an end of the second hollow tube and the end slot is configured to receive the first hook, and laser cutting a female member into the upper wall of the second hollow tube, wherein the female member is between the opposing slots and is configured to receive the male member to secure the first hollow tube to the second hollow tube while the hooks engage the opposing slots.

21. The method of claim 20, further comprising laser cutting an end of a third hollow tube to form opposing tabs where each of the tabs are cut from one of opposing sidewalls of the third hollow tube, and laser cutting bottom slots in a bottom wall of the second hollow tube, wherein the bottom slots are configured to receive the opposing tabs of the third hollow tube.

22. The method of claim 20, further comprising laser cutting a first aperture in the second hook and laser cutting a second aperture in the slot configured to receive the second hook, wherein the first aperture and the second aperture align when the second hook is in the slot, and wherein the first aperture and the second aperture, when aligned, form an opening configured to receive a locking fastener, wherein the first aperture and the second aperture each has a dimension in a direction of an axis of the corresponding first hollow tube or second hollow tube, wherein the dimension is substantially equal to a diameter of the locking fastener plus a thickness of one of the hooks.

23. The method of claim 20, wherein the end slot includes:

an open side aligned with the end of the second hollow tube, and a closed side formed by the recess in the end of the second hollow tube.

24. The method of claim 20, wherein the laser cutting of the second hollow tube includes:

laser cutting the opposing slots and the female member adjacent the end of the second hollow tube wherein the opposing slots partially extend through the sidewall of the second hollow tube, and laser cutting a second set of slots and a second female member adjacent the end of the second hollow tube, wherein the second set of slots partially extend through a second sidewall of the hollow tube, and the second sidewall is opposite to the sidewall.

25. A framing system comprising:

a first hollow tube with opposing first sidewalls, a first upper sidewall and a first lower sidewall;

opposing hooks at a longitudinal end of the first hollow tube, the opposing hooks extending from the opposing first sidewalls of the first hollow tube, respectively;

a second hollow tube having opposing second sidewalls, a second upper sidewall and a second lower sidewall;

opposing slots each extending partially through one of the second sidewalls and partially through the second upper sidewall;

wherein the opposing hooks include a first hook and a second hook;

wherein the opposing slots include an end slot formed by a cutout in a longitudinal end of the second hollow tube and the cutout is partially in the one of the opposing second sidewalls and partially in the second upper sidewall, and wherein the end slot is configured to receive the first hook.

* * * * *